US008833157B2

(12) United States Patent
Bremigan, III et al.

(10) Patent No.: US 8,833,157 B2
(45) Date of Patent: Sep. 16, 2014

(54) ULTRASONIC FLOW SENSOR FOR DETECTING LIQUID IN A TUBE INCLUDING INTERMEDIATE PLATES MOUNTED TO THE TUBE FOR MOUNTING ULTRASONIC TRANSDUCERS

(75) Inventors: Charles F. Bremigan, III, Jarrell, TX (US); Kenneth A. Albrecht, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 444 days.

(21) Appl. No.: 13/263,601

(22) PCT Filed: Mar. 10, 2010

(86) PCT No.: PCT/US2010/026810
§ 371 (c)(1),
(2), (4) Date: Oct. 7, 2011

(87) PCT Pub. No.: WO2010/117536
PCT Pub. Date: Oct. 14, 2010

(65) Prior Publication Data
US 2012/0031199 A1 Feb. 9, 2012

Related U.S. Application Data

(60) Provisional application No. 61/167,616, filed on Apr. 8, 2009.

(51) Int. Cl.
*G01F 23/28* (2006.01)
*G01F 23/00* (2006.01)
*G01F 23/296* (2006.01)

(52) U.S. Cl.
CPC ........ *G01F 23/2961* (2013.01); *G01F 23/2968* (2013.01); *G01F 23/2965* (2013.01)

USPC .......................................... 73/291; 73/290 V

(58) Field of Classification Search
None
See application file for complete search history.

(56) References Cited

U.S. PATENT DOCUMENTS

| 3,456,715 | A | 7/1969 | Freedman et al. |
| 5,428,984 | A | 7/1995 | Jones et al. |
| 5,437,194 | A * | 8/1995 | Lynnworth ................ 73/861.27 |
| 5,697,248 | A | 12/1997 | Brown |
| 7,185,547 | B2 * | 3/2007 | Baumoel .................... 73/861.27 |
| 2007/0044708 | A1 | 3/2007 | Haynes et al. |
| 2009/0056451 | A1 | 3/2009 | Haynes et al. |

OTHER PUBLICATIONS

ISR for PCT/US2010/026810 dated Oct. 20, 2010.

* cited by examiner

*Primary Examiner* — Harshad R Patel
(74) *Attorney, Agent, or Firm* — Levenfeld Pearlstein, LLC

(57) ABSTRACT

An ultrasonic liquid sensor for detecting liquid in a tube having sidewalls includes a first intermediate mounting plate held in physical communication with a first sidewall of the tube, a second intermediate mounting plate held in physical communication with the second sidewall of the tube. The plates are configured to allow the ultrasonic signal to pass therethrough. The sensor also includes a first and a second transducer element. The first and second transducer elements are mounted to the intermediate mounting plates and are configured to receive the ultrasonic signal passing through the sidewalls of the tube as well as the intermediate mounting plates to determine the presence or absence of liquid in the tube. The sensor can be enclosed in a self-contained unit and a support assembly can be used and formed of metal material or non-metal material to interface with the sensor and a secondary circuit.

12 Claims, 6 Drawing Sheets

ULTRASONIC FLOW SENSOR FOR DETECTING LIQUID IN A TUBE INCLUDING INTERMEDIATE PLATES MOUNTED TO THE TUBE FOR MOUNTING ULTRASONIC TRANSDUCERS

This application is national phase of PCT/US2010/026810 filed Mar. 10, 2010, and claims the benefit of priority of Provisional U.S. Patent Application Ser. No. 61/167,616, filed Apr. 8, 2009, entitled "SYSTEM AND METHOD FOR FABRICATING AN ULTRASONIC LIQUID SENSOR".

CROSS-REFERENCE TO RELATED APPLICATION

This application claims the benefit of priority of Provisional U.S. Patent Application Ser. No. 61/167,616, filed Apr. 8, 2009, entitled "SYSTEM AND METHOD FOR FABRICATING AN ULTRASONIC LIQUID SENSOR".

BACKGROUND OF THE INVENTION

The present invention is directed to a sensing device. More particularly, the present invention pertains to a sensing device used to detect the presence or absence of liquid within a tube.

Fluid or liquid within a tube or conduit may be detected using ultrasonic waves. Typically, a transmitting transducer is positioned on one side of a tube and a receiving transducer is positioned on the opposing side of the tube. The transmitting transducer emits an ultrasonic signal, which is propagated through the tube wall and into the tube itself. If the tube is empty, no signal is received by receiving transducer. If there is liquid present in the tube, however, the receiving transducer receives a signal and conveys the signal to, for example, a control circuit.

Typically, the ultrasonic energy is generated and received by a pre-made joint sensor system consisting of a transmitting transducer and receiving transducer pre-fastened to a hollow, open-ended sleeve. In order to use the joint sensor system with a desired tube, a section of the tube is removed and the joint sensor system is joined to the tube at the area where the portion of tube has been removed. The tube is connected to the sleeve such that liquid passes through the sleeve, and the joint is then sealed at each end of the sleeve to the tube. The joint sensor system then becomes an integral part of the tube. While effective, such joints and seals are prone to leakage. In addition, placing the sensor integrally within the line of the tube is not only time-consuming, but also expensive.

In another embodiment, transducers are applied directly to the tube sidewalls with fastening agents such as screws or chemical means, such as adhesive. Unfortunately, these fastening agents do not always maintain a secure connection and may absorb and/or distort the ultrasonic waves. In addition, in this configuration, the bottom electrode of the transducer may not be in electrical communication with the control circuit effectively, and thus, the signal becomes distorted and/or attenuated.

Accordingly, there is a need for an ultrasonic liquid sensing device that maintains contact with the tube and does not distort or otherwise interfere with the transmission and reception of ultrasonic waves. Such a sensor is easy to mount and can be used and re-used with a variety of different sized and shaped tubes. Most desirably, no cutting of the tube is necessary and the tube maintains its structural integrity.

BRIEF SUMMARY OF THE INVENTION

An ultrasonic liquid sensor for detecting liquid in a tube having sidewalls includes a first intermediate mounting plate, a second intermediate mounting plate, a first transducer element, and a second transducer element. The first and second intermediate mounting plates are held in constant physical communication with a first and second sidewall, respectively, of the tube and are configured to allow an ultrasonic signal to pass therethrough. The plate can be fabricated from metal or non-metal materials. The non-metal plate can have conductive material included therein to provide an electrical connection path for the transducer circuitry.

The intermediate mounting plates have first and second sides. The second sides of the intermediate mounting plates are held in close physical communication with the sidewalls of the tube, while the transducers are mounted to the opposing (first) sides of each of the intermediate mounting plates such that, in a use-position, the intermediate mounting plates are positioned between the tube sidewalls and the transducers.

The first transducer element, mounted to the first intermediate mounting plate, is configured to transmit an ultrasonic signal through the first intermediate mounting plate and the first sidewall of the tube. The second transducer element, mounted to the second intermediate mounting plate, is configured to receive the ultrasonic signal passing through the second sidewall of the tube and through the second intermediate mounting plate, in order to determine the presence or absence of liquid in the tube. The sensor can be enclosed in a self-contained unit.

In an embodiment, the intermediate mounting plates have sufficient rigidity and strength to maintain continual and consistent direct, physical contact with the sidewalls of the tube while interfacing directly with a secondary electrical circuit. In another embodiment, a support assembly and/or a housing base assists in maintaining the intermediate mounting plates in direct, physical contact with the sidewalls of the tube. The support assembly and housing bases can both be formed of metal material or non-metal material and can serve to interface with the sensor and a secondary circuit. In an embodiment, the support assembly and/or housing bases provide rigid support to the intermediate mounting plates without the use of screws or adhesive while maintaining the shape and integrity of the tube and without attenuating or interfering with the sensor signal.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
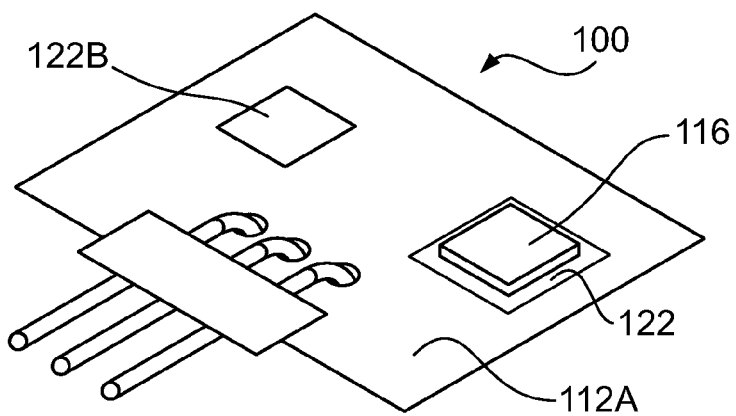
FIG. 1 is a perspective view of a portion of an ultrasonic liquid sensor.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present ultrasonic liquid sensor, an ultrasonic signal is propagated between two transducers, through the material of intermediate mounting plates, and through a tube, in order to determine the presence or absence of liquid in the tube. In the present disclosure, "liquid" refers to any fluid medium capable of propagating an ultrasonic signal therethrough and includes any water-based or oil-based solution or mixture, gels and the like. In addition, a "tube" refers to any hollow conduit through which liquid may be passed and have any shaped cross-section, including but not limited to circular, rectangular, squared, oval, and the like.

Figure 2:
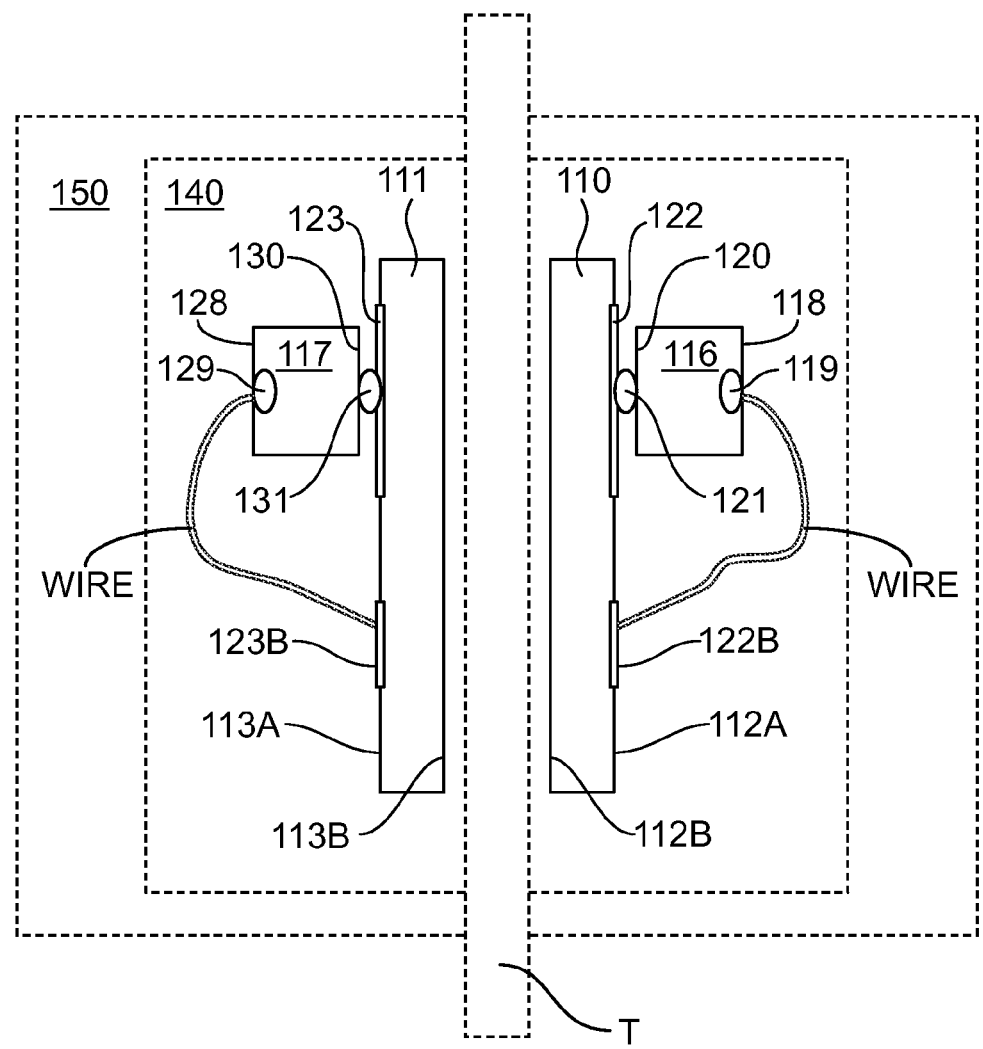
FIG. 2 is a top view of the ultrasonic liquid sensor in accordance with the principles of the present invention.

Referring now to the figures and in particular FIGS. 1 and 2, there is shown an exemplary embodiment of an ultrasonic liquid sensor 100 ("sensor") in accordance with the principles of the present invention. The sensor 100 includes a pair of intermediate mounting structures, hereafter referred to as first and second intermediate mounting plates 110, 111 respectively, as well as a transmitting transducer 116 and a receiving transducer 117.

The first and second intermediate mounting plates 110, 111 can be relatively flat plates, discs, or other shaped elements. The first and second intermediate mounting plates 110, 111 may be fabricated from conductive or non-conductive materials and can include, but are not limited to, aluminum, steel, stainless steel, common die casting materials such as zinc, brass, plastics such as polyphenylene sulfide (PPS), fiberglass materials such as printed circuit board material (FR4), and mechanically rigid thermoset. It will be appreciated by those skilled in the art that this list is not exhaustive and includes any type of material which allows ultrasonic waves to pass through without distorting or attenuating the ultrasonic signal unduly.

The first intermediate mounting plate 110 has a first side 112A and a second side 112B. Similarly, the second intermediate mounting plate 111 also has a first side 113A and a second side 113B. Each intermediate mounting plate 110, 111 is rigid, and in a use-configuration is positioned with second sides 112B and 113B placed in physical communication with the outer sidewalls of the tube T.

The transmitting transducer 116 is mounted to the first intermediate mounting plate 110. The transmitting transducer 116 has a top side 118 (with a top electrode 119) and a bottom side 120 (with a bottom electrode 121). The bottom side 120 of the transmitting transducer 116 is mounted to the first side 112A of the intermediate mounting plate 110. The bottom side 120 may be bonded to a conductive pad 122 on the intermediate mounting plate 110 or may be bonded to the intermediate mounting plate 110 directly if the intermediate mounting plate 110 is formed of a conductive material.

Similarly, the receiving transducer 117 is mounted to the second intermediate mounting plate 111. The receiving transducer 117 has a top side 128 (including a top electrode 129) and a bottom side 130. The bottom side 130 (including a bottom electrode 131) of the receiving transducer 117 is mounted to the first side 113A of the intermediate mounting plate 111. The bottom side 120 of the receiving transducer 117 may be bonded to a conductive pad 123 on the intermediate mounting plate 111 or may be bonded to the intermediate mounting plate 111 directly if the intermediate mounting plate 111 is formed of a conductive material.

Figure 3:
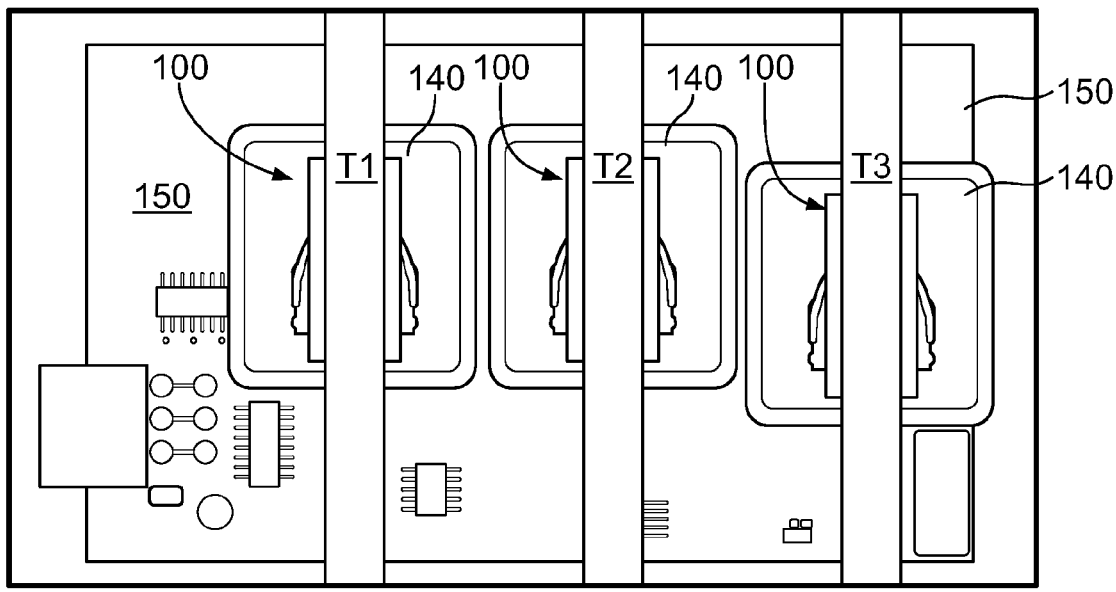
FIG. 3 is a perspective photograph of a plurality of the present sensors mounted to a printed circuit board.
Figure 4:
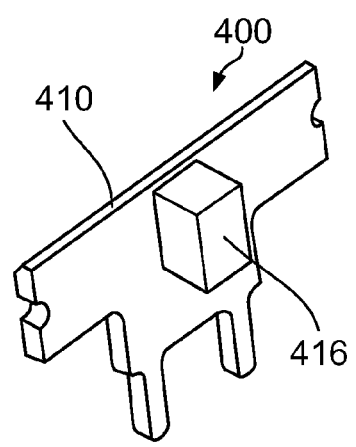
FIG. 4 is a perspective view of an intermediate mounting plate and transducer.
Figure 5:
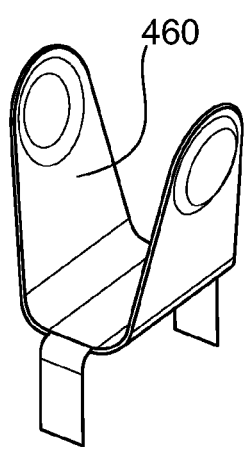
FIG. 5 is a perspective view of a shared contact.

In an embodiment shown in FIGS. 2 and 3, sensor 100 includes a support assembly 140 for the intermediate mounting plates 110, 111. The support assembly 140 may be manufactured from plastics or metals, from conductive, non-conductive, or a combination of conductive and non-conductive material. Such materials, as discussed above, can include, but are not limited to, aluminum, steel, stainless steel, common die casting materials such as zinc, brass, plastics such as polyphenylene sulfide (PPS), common injection molding materials, fiberglass materials such as printed circuit board material (FR4), and mechanically rigid thermoset. The support assembly 140 may include any circuitry necessary to interface with a secondary circuit 150 and the sensor 100.

It will be appreciated by those skilled in the art that a support assembly may not be required; the intermediate mounting plates may be formed with sufficient rigidity and strength to maintain physical contact with the sidewalls of the tube without additional support. It will also be appreciate by those skilled in the art that in an embodiment having no support assembly as described, an interface between the sensor and a control circuit or other secondary circuit may still be required and is anticipated and contemplated by the present disclosure.

Figure 6:
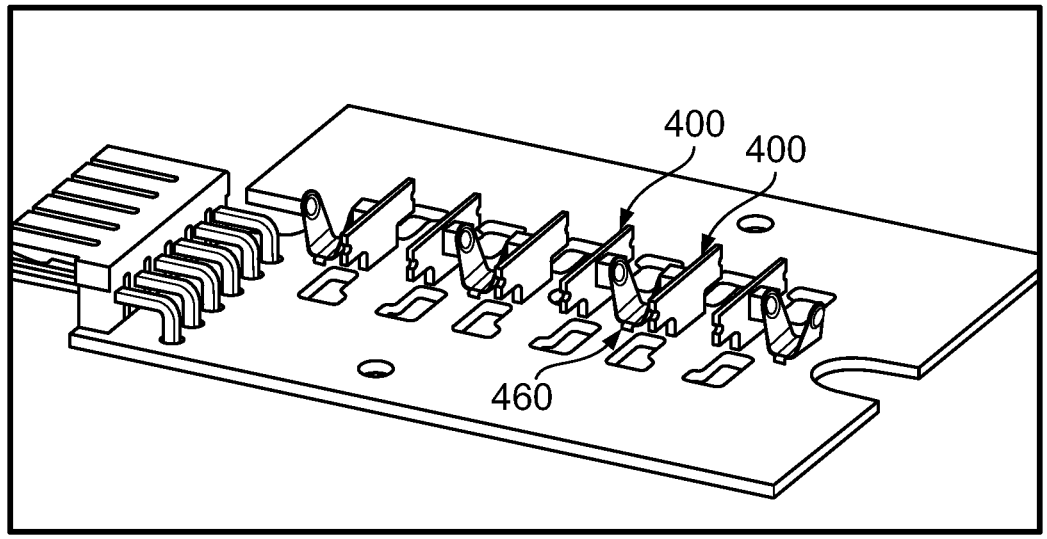
FIG. 6 is a perspective view of an array of an embodiment of the present sensors.
Figure 7:
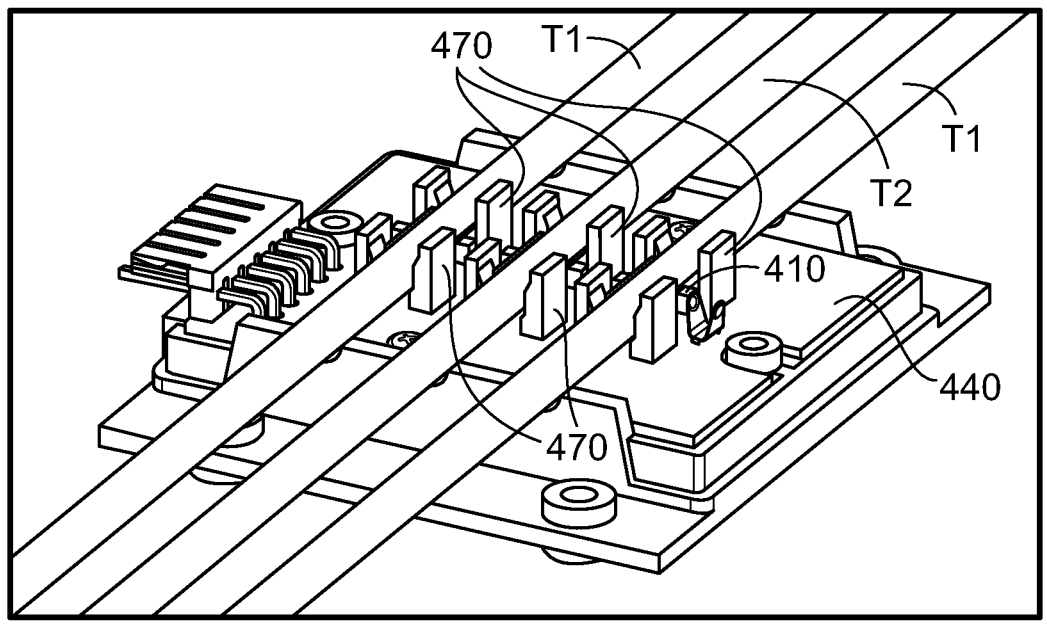
FIG. 7 is a perspective view of the array of FIG. 6.
Figure 7A:
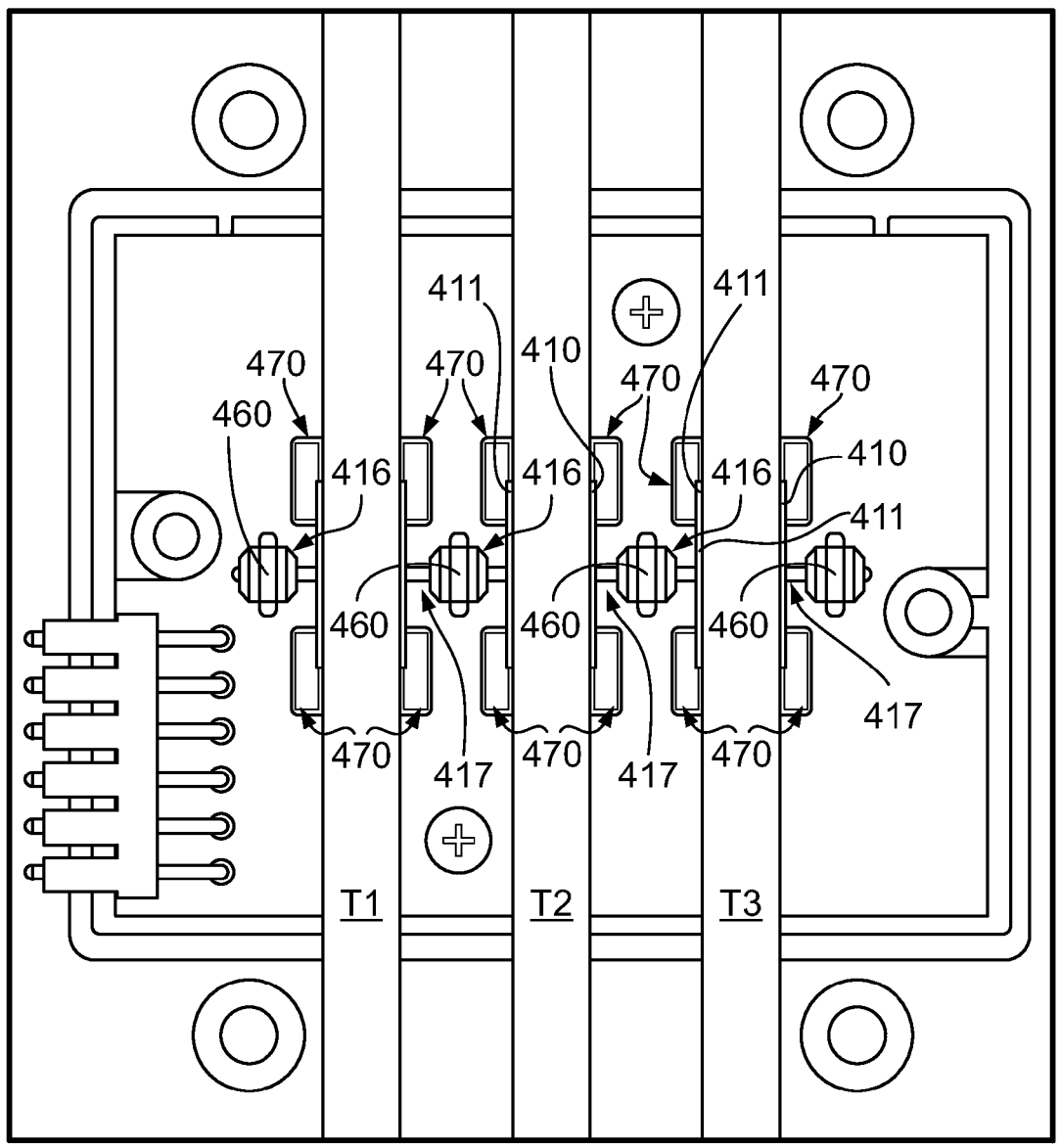
FIG. 7A is a top view of the array of FIG. 7 with a support assembly and housing bases.
Figures 8, 9:
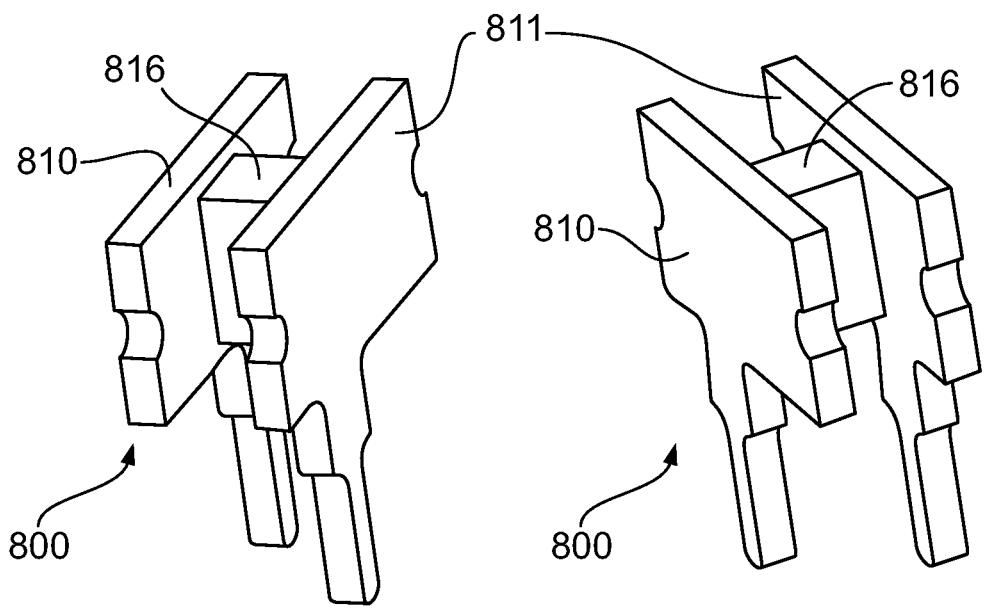
FIGS. 8 and 9 are perspective views of another embodiment of the present sensor.

In another exemplary embodiment shown in FIGS. 4-7, a sensor 400 includes an intermediate mounting plate 410, a transducer 416, and a shared contact 460. The transducer 416 can be configured as a transmitting transducer or as a receiving transducer. In a use-position, as shown in FIG. 6, the shared contact 460 is positioned between two sensor assemblies 400 (400A and 400B), contacting the transducers 416 of each of the two sensor assemblies. Tubes T1, T2, and T3, may be positioned between the intermediate mounting plates with additional support for the intermediate mounting plates provided by the support assembly 440 and/or the housing base 470, as shown in FIGS. 6, 7, and 7A.

Figure 10:
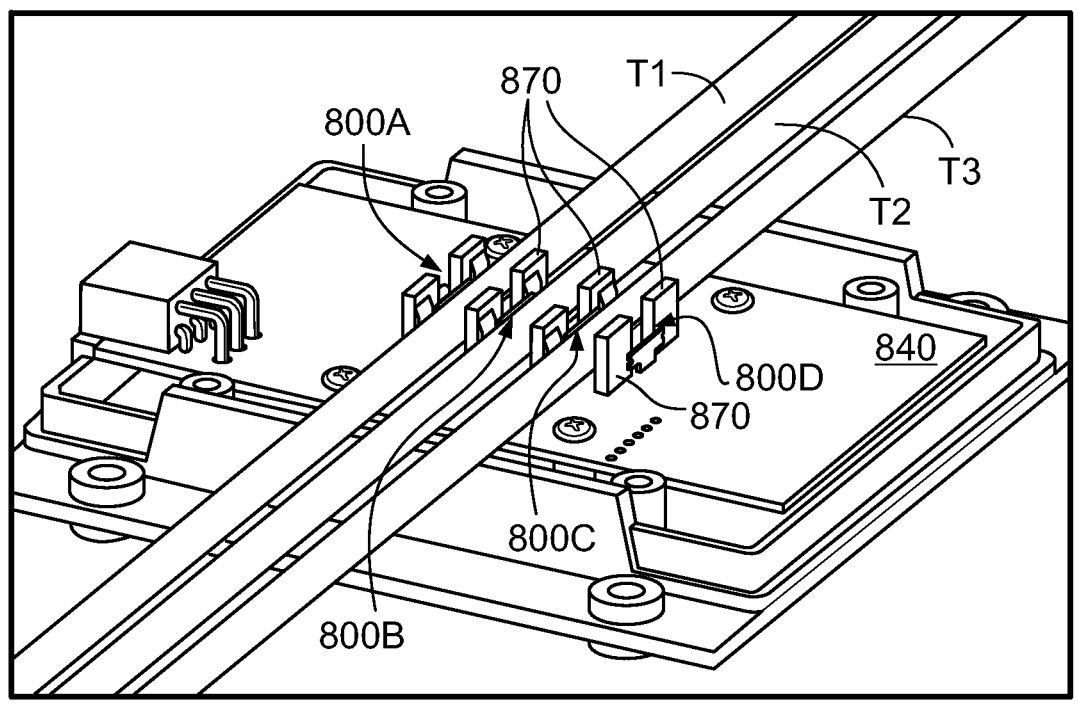
FIG. 10 is a perspective view of an array of the sensor embodiment of FIGS. 8 and 9.
Figure 11:
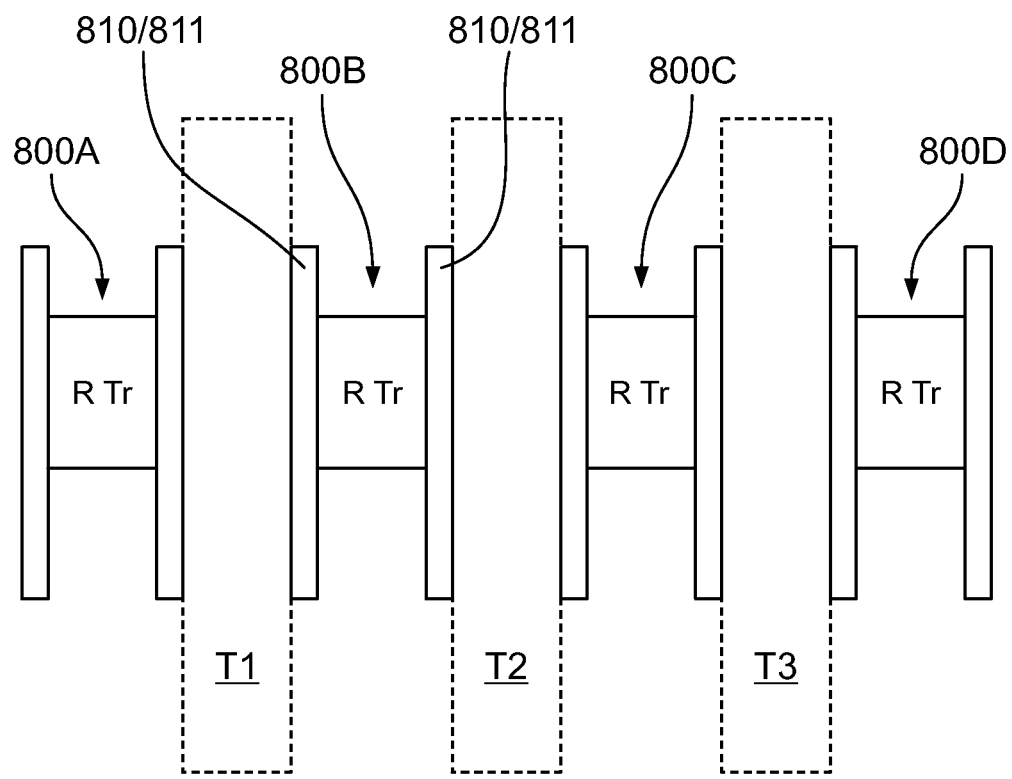
FIG. 11 is a top view of the array of FIG. 10.

In yet another exemplary embodiment shown in FIGS. 8-11, sensor 800 includes a pair of intermediate mounting plates 810, 811 with a transducer 816 sandwiched between intermediate mounting plates 810, 811. In a use-configuration, as shown in FIG. 10, sensor 800A is paired with other sensors 800B, 800C, and 800D. In the example shown in FIG. 10, three tubes T1, T2, and T3 are positioned between two adjacent sensors 800, such that the intermediate mounting plates 811 of each sensor 800 is in physical contact with the sidewall of one tube and the intermediate mounting plate 810 is in physical contact with the sidewall of an adjacent tube. In the embodiment shown in FIG. 10, a housing base 870 and/or support assembly 840 is also present.

In the embodiments discussed above, the sensor operates in a manner such that an ultrasonic signal is transmitted from the transmitting transducer, propagates through the first intermediate mounting plate, through the tube first sidewall, through any liquid present, through the opposite sidewall (second sidewall) of the tube, and through the second intermediate mounting plate of the sensor until it is finally received by the receiving transducer. The signal is then transformed by the transducer and relayed to a control circuit or the like to indicate the presence or absence of liquid within the tube. It will be appreciated by those skilled in the art that the transducers themselves are not in physical contact with the sidewalls of the tubes; it is the intermediate mounting plates which maintain physical contact with the sidewalls.

For example, in FIGS. 1-3, the sensor 100, the transmitting transducer 116, mounted to the first intermediate mounting plate 110, emits an ultrasonic signal. The material of the first intermediate mounting plate 110 is capable of allowing the ultrasonic signal to pass through without modifying, attenuating, or distorting the ultrasound signal. The intermediate mounting plate 110 is in physical communication with the sidewall of the tube T such that the ultrasound signal then passes into the tube T. If there is no liquid present in the tube T, the ultrasound signal will stop or not continue to propagate.

If, however, there is liquid present, the ultrasound signal will propagate through the liquid and penetrate the opposing sidewall of the tube T. As with the first intermediate mounting plate 110, the second intermediate mounting plate 111 is also made from a material which allows the ultrasound signal to pass through, again without modification, attenuation, or distortion. The ultrasound signal is received by the receiving transducer 117. The receiving transducer 117 can then convert the ultrasound signal to an electrical signal and relay that signal to a secondary circuit 150 such as a control circuit. The electrical signal may be relayed through the circuitry enclosed in the support assembly interface, or directly from the transducer through another form of electrical interface.

In the embodiments shown in FIGS. 4-7 and 8-11, the number of individual components needed when used with a plurality of tubes can be decreased. In the embodiments of FIGS. 4-7 and 8-11, because the transducers serve as dual mode transducers (i.e. act as both transmitting and receiving transducers) fewer components are necessary in these embodiments.

For example, in FIGS. 4-7, the sensors 400A, 400B, and 400C operate in essentially the same manner as the embodiment shown in FIG. 3 and described above, with a slight modification. The pair of mounting plates 400 provide the same ultrasonic function as mounting plates 110 and 111 above, but with the use of the shared contact 460, the plates 410 and shared contact 460 provide an electrical path for both the transmitting and receiving transducer pairs.

In another example shown in FIGS. 8-11, the sensors 800A, 800B, 800C, and 800D operate the same way as the embodiment shown in FIG. 3 and described above, again with a slight modification. The pair of mounting plates 800 provide the same ultrasonic function as mounting plates 110 and 111, but with the use of plates 810 and 811 an electrical path for both the transmitting and receiving transducer pairs is provided and when placed between a pair of liquid tubes, for example, T1 and T2 or T2 and T3 as shown in FIG. 10, a single transducer and plate assembly 800 situated between the tubes can alternate between the function of a transmitter for one tube and a receiver for the other tube.

The advantages to the present ultrasonic liquid sensor will be appreciated by those skilled in the art. The sensor provides a cost-effective assembly and method for determining the presence or absence of liquid in a tube. The present sensor eliminates the need for the tube to be cut in order for the sensor to be inserted, thus maintaining the integrity of the tube. The present sensor is easy to install and maintain. In addition, the sensor can be re-used with different tubes and can be adjusted to fit any diameter tube.

All patents referred to herein, are incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An ultrasonic liquid level sensor, comprising:
  a vertical tube having a continuous side wall and a first upper open end and a second lower open end;
  a first intermediate mounting plate held in physical communication at a first location on the sidewall of the tube;
  a second intermediate mounting plate held in physical communication at a second location on the sidewall of the tube radially spaced from the first location on the side wall of the tube;
  a first transducer element, the first transducer element mounted to the first intermediate mounting plate and configured to transmit an ultrasonic signal through the first intermediate mounting plate and through the sidewall of the tube at the first location on the sidewall of the tube; and
  a second transducer element, the second transducer element mounted to the second intermediate mounting plate and configured to receive the ultrasonic signal passing through the sidewall of the tube at the second location on the sidewall of the tube and through the second intermediate mounting plate to determine the presence or absence of liquid in the second lower open end of the tube,
  wherein the first and second transducer elements are radially spaced from one another.

2. The sensor of claim 1 wherein the first and second intermediate mounting plates are held in constant physical communication with respective locations on the sidewalls of the tube and are configured to allow the ultrasonic signal to pass therethrough.

3. The sensor of claim 1 wherein the first intermediate mounting plate is, in a use-position, positioned between the location on the sidewall of the tube and the first transducer element, and wherein the second intermediate mounting plate is, in a use-position, positioned between the location on the sidewall of the tube and the second transducer element.

4. The sensor of claim 1 wherein the first and second intermediate mounting plates are fabricated from metal or non-metal materials.

5. The sensor of claim 4 wherein the non-metal intermediate mounting plate includes conductive material included therein to provide an electrical path for transducer circuitry.

6. The sensor of claim 1, wherein the sensor is enclosed in a self-contained unit.

7. The sensor of claim 1 wherein each of the first and second intermediate mounting plates are held in direct, physical communication with each of the first and second locations on the sidewalls of the tube, respectively, by one or more support assemblies.

8. The sensor of claim 7 wherein the one or more support assemblies provide an electrical interface between the sensor and a secondary circuit.

9. The sensor of claim 7 wherein the one or more support assemblies is formed of metal or non-metal material.

10. The sensor of claim 7 wherein the one or more support assemblies is a housing base.

11. The sensor of claim 7 wherein the one or more support assemblies includes a housing base.

12. The sensor of claim 7 wherein the one or more support assemblies supports the first and second intermediate housing plates without fasteners c adhesive.

* * * * *